United States Patent
Yamanaka et al.

(10) Patent No.: US 6,880,407 B2
(45) Date of Patent: Apr. 19, 2005

(54) LOAD SENSOR WITH USE OF CRYSTAL RESONATOR

(75) Inventors: Masami Yamanaka, Akashi (JP); Motoyuki Adachi, Akashi (JP); Akio Chiba, Sayama (JP); Kozo Ono, Sayama (JP)

(73) Assignees: Yamata Scale Co., Ltd., Akashi (JP); Nihon Dempa Kogyo Co., Ltd., Akashi (JP)

( * ) Notice: Subject to any disclaimer, the term of this patent is extended or adjusted under 35 U.S.C. 154(b) by 0 days.

(21) Appl. No.: 10/163,858

(22) Filed: Jun. 5, 2002

(65) Prior Publication Data

US 2003/0006853 A1 Jan. 9, 2003

(30) Foreign Application Priority Data

Jun. 11, 2001 (JP) .................................... 2001-175327

(51) Int. Cl.⁷ ........................ G01B 7/16; H01L 41/04
(52) U.S. Cl. ................................. 73/778; 310/353
(58) Field of Search ................... 73/778; 310/361, 310/320, 365, 353

(56) References Cited

U.S. PATENT DOCUMENTS

| | | | |
|---|---|---|---|
| 4,126,801 A | | 11/1978 | Corbett |
| 4,135,108 A | * | 1/1979 | Besson ........................ 310/344 |
| 4,175,243 A | | 11/1979 | Corbett |
| 4,486,681 A | * | 12/1984 | Ishigami et al. ............. 310/353 |
| 4,644,804 A | * | 2/1987 | Ramm et al. ............. 73/862.59 |

FOREIGN PATENT DOCUMENTS

| | | |
|---|---|---|
| EP | 0 052 318 | 5/1982 |
| FR | 2 013 631 | 4/1970 |
| GB | 2 142 430 | 6/1984 |

OTHER PUBLICATIONS

R. A. Watson, "Force Sensor Crystal Mounting," IBM Technical Disclosure Bulletin, vol. 10, No. 4 (Sep. 1967).
T. Ueda et al., "Precision Force Transducers Using Mechanical Resonators," *Measurement*, vol. 3, No. 2 (Apr. 1985).
European Search Report, EP 02 25 3940, issued Jul. 31, 2003.

* cited by examiner

*Primary Examiner*—Edward Lefkowitz
*Assistant Examiner*—Lilybett Martir
(74) *Attorney, Agent, or Firm*—Alleman Hall McCoy; Russell & Tuttle LLP (57) ABSTRACT

Excitation electrodes are respectively affixed to central portions of both surfaces of a long plate-shaped AT-cut crystal resonator, the central portion starts a thickness shear oscillation in the length direction of the crystal resonator when an electric signal is applied to the central portion of the crystal resonator through the excitation electrodes. And, channel-shaped, half-circular-shaped, or trapezoid grooves in cross-section are respectively formed in the plate width direction on middle portions between the center portion and end portions of the crystal resonator. These grooves are formed so as to be symmetrical with respect to a thickness-wise central position of the crystal resonator through a well-known etching technique such as photo-etching and the like.

2 Claims, 7 Drawing Sheets

LOAD SENSOR WITH USE OF CRYSTAL RESONATOR

CROSS-REFERENCE TO RELATED APPLICATIONS

This application is based on and claims priority to Japanese Patent Application No. 2001-175327, filed on Jun. 11, 2001, the entire disclosure of which is herein incorporated by references for all purposes.

FIELD OF THE INVENTION

The present invention relates to a load sensor using a crystal resonator for measuring a load, and more specifically to a load sensor capable of minimizing as much as possible outward leakage of oscillation energy of a thickness shear oscillation caused by a crystal resonator.

BACKGROUND OF THE INVENTION

Strain-gauge load cells have been widely used as a load sensor for electronic weighing scales. However, in these years, with rapid advance in electronic measurement technologies, load sensors which are more accurate than the strain-gauge load cells have been developed. Of these load sensors, different types such as a tuning fork type, a string oscillation type, a gyroscope type, and the like, have already been put into practical use.

Incidentally, as such a load sensor with a high degree of accuracy, an oscillation-type load sensor using a quartz resonator has been proposed. This load sensor takes advantage of the phenomenon that the oscillation frequency of an AT-cut quartz plate piece which is under thickness shear oscillation excited by exciting means, varies in proportion to a force applied to the quartz piece parallel to a plate face thereof. The quartz resonator has advantages such as less temperature dependency, oscillation with stable frequency, and inexpensiveness. For these reasons, the use of the quartz resonator makes it possible to attain a load sensor which is higher in accuracy and lower in cost as compared to load sensors described above, such as the tuning fork type, the string oscillation type, the gyroscope type, and the like.

Figure 8:
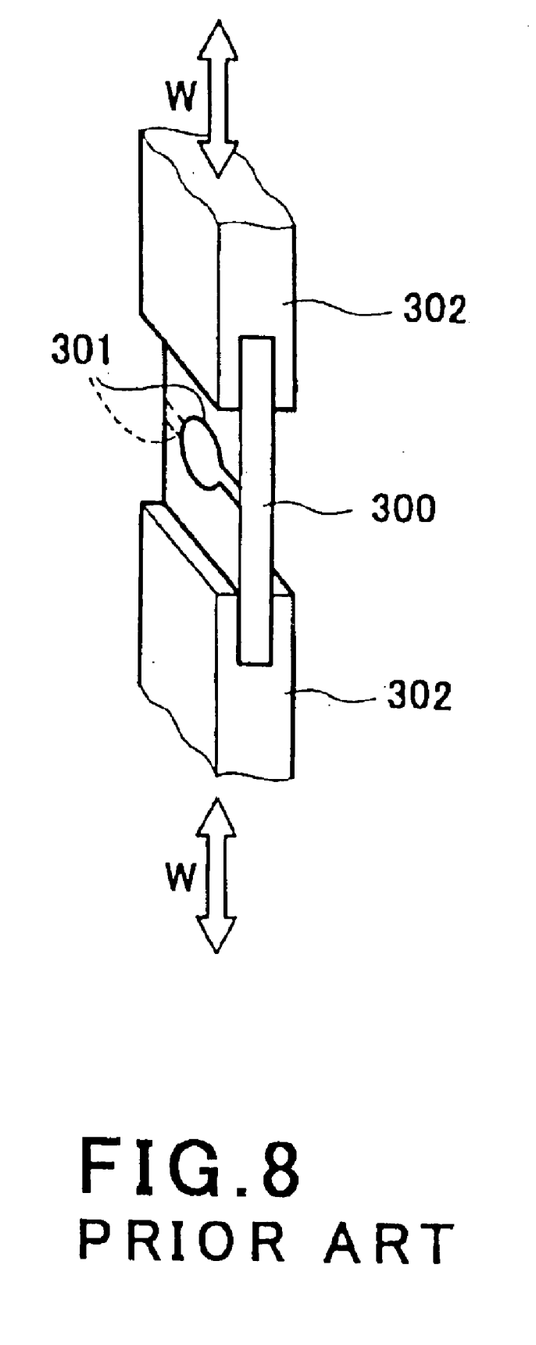
FIG. 8 is a perspective view showing a constitution of the basic parts of the conventional load sensor using a crystal resonator.

FIG. 8 is a perspective view showing a constitution of basic parts of a conventional load sensor using a quartz resonator. In FIG. 8, a quartz plate resonator 300 is a quartz piece which oscillates in a thickness shear oscillation mode in the length direction. Electrodes 301, 301 are respectively affixed to both faces of the quartz resonator 300, and these electrodes 301, 301 are connected to an oscillation circuit (not shown) which oscillates in proportion to the oscillating frequency of the quartz resonator 300.

As shown in FIG. 8, grooves which are rectangular in cross-section are formed at end portions of supporting bodies 302, 302 which support the quartz resonator 300 throughout the plate widths. And, the quartz resonator 300 is retained by the supporting bodies 302, 302 in the thickness direction by fitting both of the end portions of the quartz resonator 300 into the grooves.

In the load sensor thus constructed, when a load W is applied on the quartz resonator 300 in the compressing direction, the oscillation frequency of the quartz resonator 300 changes in proportion to the load W, and then the oscillation frequency of the above-described oscillation circuit changes in proportion to the change. The load W is measured by detecting this change in the oscillation frequency.

In some cases, both of the end portions of the quartz resonator 300 and the grooves formed at the ends of the supporting bodies 302, 302 may be fixed to each other by use of adhesive or the like. In these cases, since the quartz resonator 300 remains fixed even if the supporting bodies 302, 302 move away from each other, a load W applied in the pulling direction can also be measured.

However, as described above, when both of the end portions of the quartz resonator 300 are supported by the supporting bodies 302, 302, the thickness shear oscillation of the quartz resonator 300 in the length direction is restrained, thereby causing loss of the oscillation energy. Due to this, there exists such a problem that its Q (Quality factor) as an oscillator decreases.

Furthermore, since the thickness shear oscillation of the quartz resonator 300 is transmitted to the supporting bodies 302, 302, thereby causing the surrounding mechanism to resonate, there exists such a problem that measurements can not be performed with a high degree of accuracy.

SUMMARY OF THE INVENTION

The present invention has been developed under these circumstances, and an object thereof is to provide a load sensor with use of a crystal resonator which has high Q of the crystal resonator and is capable of performing measurements with a high degree of accuracy, which measurements are achieved by supporting the crystal resonator so as not to restrain the thickness shear oscillation and so as to minimize the oscillation transmitted to the supporting bodies.

In order to solve the above-described problems, a load sensor using a crystal resonator comprises: a long plate-shaped crystal resonator; supporting bodies for respectively supporting both lengthwise end portions of the crystal resonator; and exciting means for exciting a thickness shear oscillation at a center portion of the crystal resonator in the length direction, wherein middle portions whose thickness is smaller than that of the center portion are respectively provided between the center portion and both of the end portions and a load is measured based on the change in an oscillation frequency of the thickness shear oscillation of the center portion of the crystal resonator generated in proportion to the load acted thereon through the supporting bodies.

According to the present invention, since the thickness of the middle portion is smaller than that of the center portion, even if the thickness shear oscillation is excited by the exciting means at the center portion of the crystal resonator, the oscillation is not easily transmitted to both of the end portions. For this reason, the oscillation transmitted to the supporting bodies supporting both of these end portions can be reduced. Therefore, it is possible to restrain the surrounding mechanism from resonating and to realize more accurate measurements, compared to the conventional load sensor.

Furthermore, in the present invention, the central portion can be configured to form symmetrical grooves with respect to a thicknesswise central position of the crystal resonator. When the thickness shear oscillation of the crystal resonator is generated, both surfaces thereof move most, but not the thicknesswise central position of the crystal resonator. Therefore, the formation of the symmetrical grooves with respect to the thicknesswise central position will set relatively most moving portions free, thereby reducing oscillation energy loss of the crystal resonator and thus increasing Q as an oscillator, as compared to the conventional load sensor.

Furthermore, a load sensor using a crystal resonator comprises: a flat plate-shaped crystal resonator for oscillating in a thickness shear oscillation mode and supporting bodies for supporting the crystal resonator, wherein the crystal resonator is retained between the supporting bodies which are respectively in contact with and pressing opposing end faces of the crystal resonator from the outside of the crystal resonator, the end faces are configured to minimize the areas contacting the supporting bodies as much as possible, and a load is measured based on change in an oscillation frequency of the thickness shear oscillation of the crystal resonator generated in proportion to the load acted thereon through the supporting bodies.

According to the present invention, since the opposing end faces of the crystal resonator are configured to minimize as much as possible the areas that the supporting bodies are in contact with and pressing, the transmission of the thickness shear oscillation of the crystal resonator to the supporting bodies can be minimized as much as possible. Therefore, it is possible to restrain the surrounding mechanism from resonating and to realize more accurate measurements, as compared to the conventional load sensor. What is more, the fabrication of the crystal resonator is simpler for the present invention than for the above described invention.

Even furthermore, in the above-described invention, the end faces may be circular-arc-shaped. By doing so, the areas of the opposing end faces that the supporting bodies are in contact with and pressing can be minimized, and when the crystal resonator oscillates in the thickness shear oscillation mode, relatively most moving portions can be set free.

This object, as well as other objects, features and advantages of the present invention will become more apparent to those skilled in the art from the following description taken with reference to the accompanying drawings.

DETAILED DESCRIPTION OF THE PREFERRED EMBODIMENTS

Hereinbelow, preferred embodiments of the present invention will be described with reference to drawings.
Embodiment 1

Figure 1A:
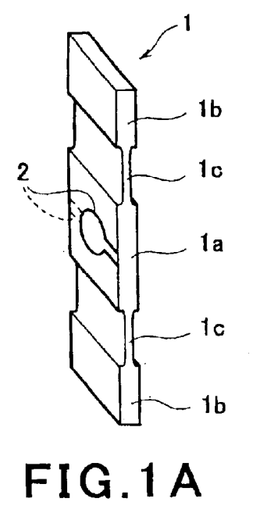
FIGS. 1A–1C are perspective views showing a crystal resonator used in a load sensor according to Embodiment 1 of the present invention.
Figure 1B:
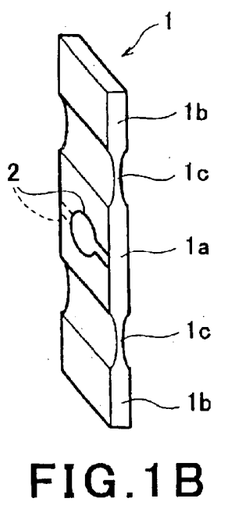
Figure 1C:
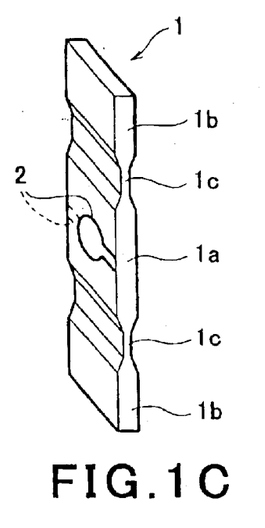

FIGS. 1A–1C are perspective views showing a crystal resonator used in a load sensor according to Embodiment 1 of the present invention. In FIGS. 1A–1C, a long-plate shape crystal resonator 1 is an AT-cut quartz piece capable of oscillating in a thickness shear oscillation mode in a length direction of the quartz resonator 1.

Excitation electrodes 2, 2 serving as exciting means are respectively affixed to both surfaces of a central portion 1a of the quartz resonator 1. The central portion 1a starts the thickness shear oscillation in the length direction of the crystal resonator 1 when an electric signal is supplied to the central portion 1a of the crystal resonator 1 through the excitation electrodes 2, 2. It should be noted that these electrodes 2, 2 are connected to an oscillation circuit described below.

As shown in FIG. 1A, channel-shaped grooves in cross-section are respectively provided in the plate width direction on both surfaces of middle portions 1c, 1c, which are located between the center portion 1a and end portions 1b, 1b of the crystal resonator 1. These grooves are formed so as to be symmetrical with respect to a thicknesswise central position of the crystal resonator 1 by use of a well-known etching technique, such as photo etching and the like.

Thus, since the grooves are formed on the middle portions 1c, 1c, the thickness of the middle portions 1c, 1c is smaller than the thickness of the central portion 1a. Because of that, even if the central portion 1a oscillates in the thickness shear oscillation mode, its oscillation is not easily transmitted to both of the end portions 1b, 1b.

Furthermore, as described before, since the grooves are formed so as to be symmetrical with respect to the thicknesswise central position of the crystal resonator 1, those portions of the plate to be moved most when the thickness shear oscillation is generated are set free. Because of this, the thickness shear oscillation can be restrained, thereby reducing the amount of oscillation energy loss.

While the channel-shaped grooves in cross-section are provided in the plate width direction on the middle portions 1c, 1c of the crystal resonator 1, as described before, these grooves are not limited to this shape and may be of any shape insofar as they are formed to be symmetrical with respect to the thicknesswise central position of the crystal resonator 1. Therefore, the shape may be, for example, of half-circle shape in cross-section as shown in FIG. 1B, or of trapezoid-shape in cross-section as shown in FIG. 1C.

Figure 2A:
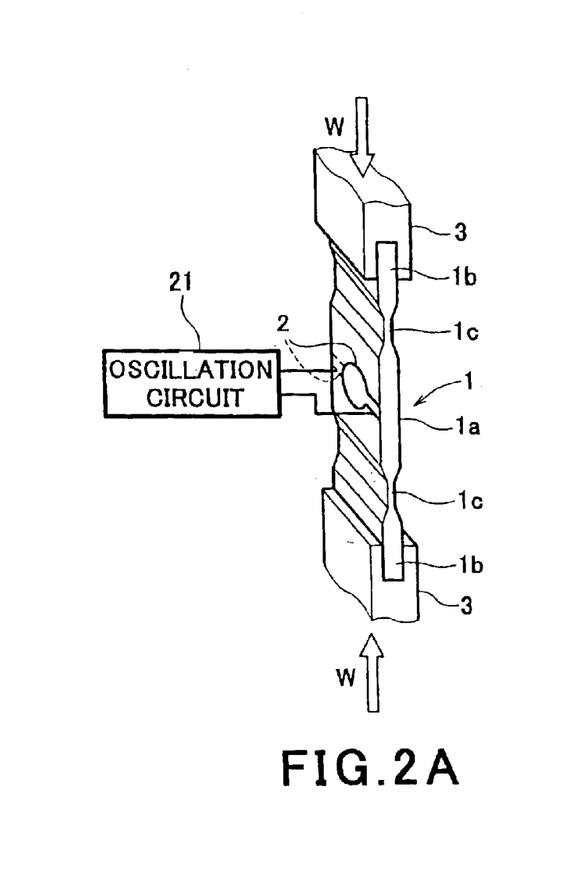
FIGS. 2A and 2B are perspective views showing the load sensor according to Embodiment 1 of the present invention.
Figure 2B:
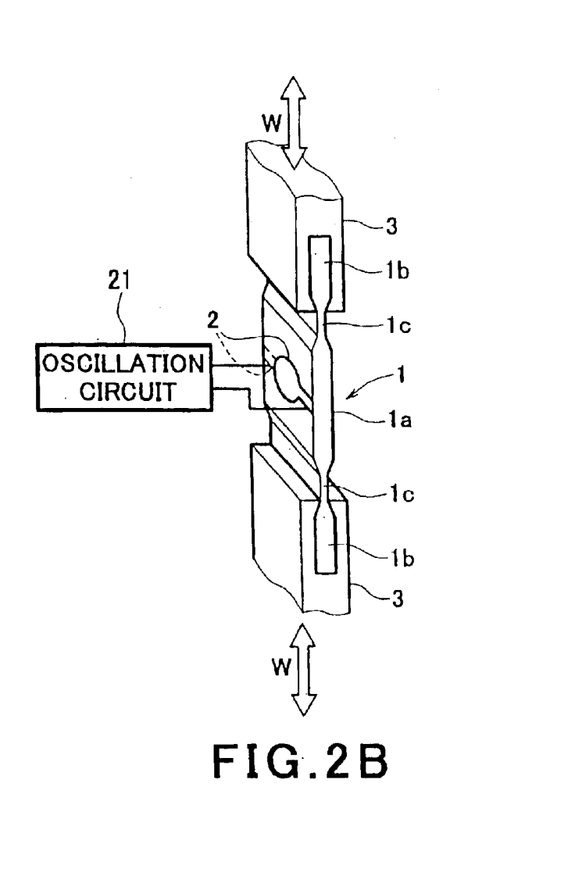

FIGS. 2A and 2B are perspective views showing load sensors according to Embodiment 1 of the present invention. As the arrows in the figure show, FIG. 2A shows a load sensor which can measure a load only in the compressing direction of the load W, and FIG. 2B shows a load sensor which can measure a load both in the compressing and pulling directions of the load W. It should be noted that, while FIGS. 2A and 2B show the load sensor with use of the crystal resonator 1 shown in FIG. 1C, it is needless to say that the crystal resonator shown in FIG. 1A or 1B may be used instead.

In FIG. 2A, rectangular grooves in cross-section are formed at the end portions of the supporting bodies 3, 3 throughout the plate width, and the crystal resonator 1 is supported by respectively fitting both of the end portions 1b, 1b of the crystal resonator 1 into these grooves. Supporting the crystal resonator 1 in the way described above enables the measurement of a load W in its compressing direction.

On the other hand, in FIG. 2B, grooves are formed at end portions of the supporting bodies 3, 3 throughout the plate widths, whose shape enables the grooves of the supporting bodies to fit on both of the end portions 1b, 1b and portions of the grooves formed on both surfaces of the middle portions 1c, 1c of the crystal resonator 1. Thus, the crystal resonator 1 is supported by respectively fitting the grooves of the supporting bodies on both of the end portions 1b, 1b and the portions of the grooves formed on both of the surfaces of the middle portions 1c, 1c. In this way, since not only both of the end portions 1b, 1b, but also the portions of the grooves of the crystal resonator are fit in the grooves of the supporting bodies, the crystal resonator 1 does not fall away even if the supporting bodies 3, 3 move in the detaching direction. Therefore, as shown by the arrows, a load W can be measured not only in the compressing direction but also in the pulling direction without using an adhesive utilized in the conventional load sensor.

As described before, the oscillation circuit 21 is connected to the excitation electrodes 2, 2. This oscillation circuit 21 oscillates in proportion to an oscillation frequency of the thickness shear oscillation of the central portion 1a of the crystal resonator 1. If a load W is applied through the supporting bodies 3, 3, the oscillation frequency of the central portion 1a should vary, and then the oscillation frequency of the oscillation circuit 21 should also vary accordingly.

Figure 3:
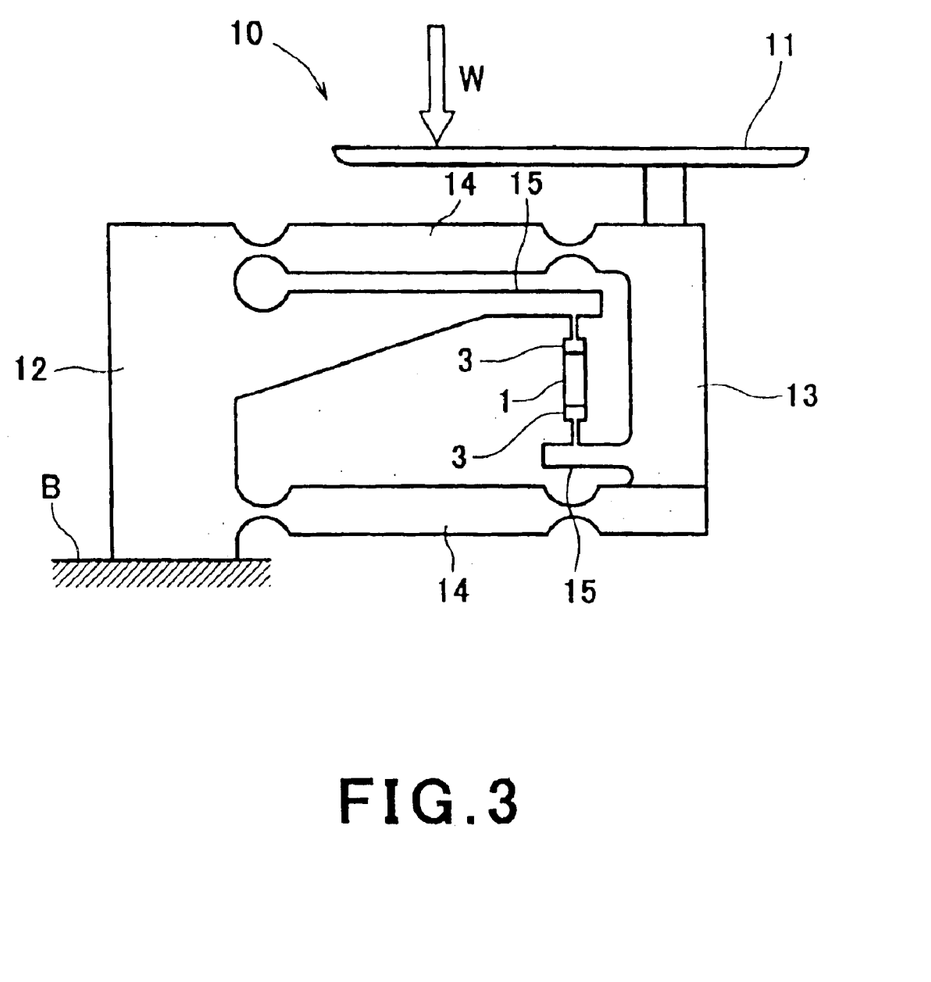
FIG. 3 is a side elevation view showing in detail a constitution of an electronic scale with use of the load sensor according to Embodiment 1 of the present invention.
Figure 4:
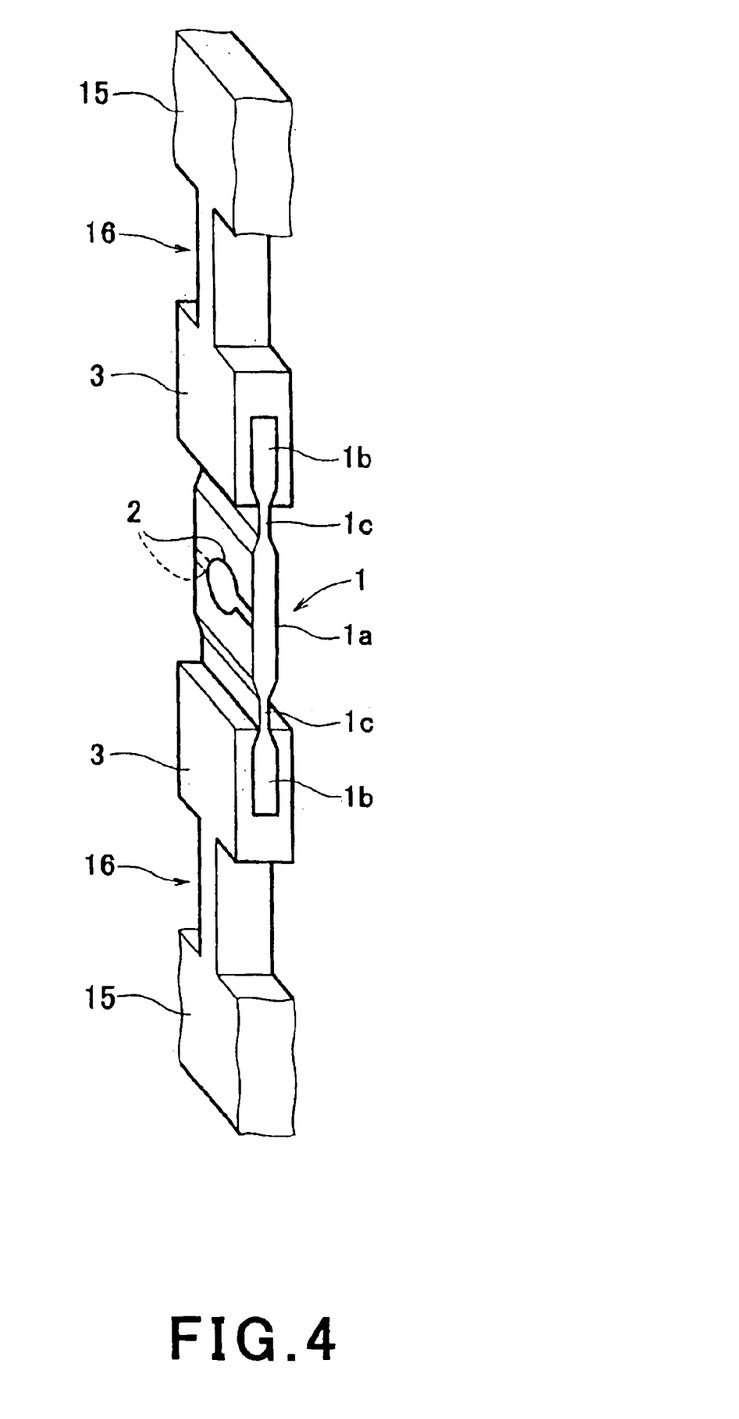
FIG. 4 is a perspective view showing a constitution of a crystal resonator and supporting bodies used in the electronic scale shown in FIG. 3.

FIG. 3 is a side elevation view showing a constitution of an electronic scale with a load sensor according to the present invention. FIG. 4 is a perspective view showing in detail a constitution of the crystal resonator 1 and the supporting bodies 3, 3 which are used in the electronic scale. As shown in FIG. 3, the electronic scale 10 is configured such that a tray 11 used to receive a load W is supported through the so-called Roberval's mechanism. This Roberval's mechanism comprises a fixed pole 12 fixed to a base table B, a movable pole 13 for supporting the tray 11 described above, and upper and lower beams 14, 14 arranged to be parallel to each other.

Levers 15, 15 are respectively provided at and protruded inwardly from an upper portion of the fixed pole 12 and a lower portion of the movable pole 13, and the supporting bodies 3, 3 for supporting the crystal resonator 1 are respectively attached to tip portions of the levers 15, 15.

Half-circle-shaped cutout portions are respectively provided at upper and lower portions of the beams 14, 14, and the thickness between the upper and lower cutout portions is small. Because of this, when the movable pole 13 moves downwardly due to a load W, the beams 14, 14 should be bent downwardly in proportion to the move. By controlling the extent of the bend, the parallel relation between the beams 14, 14 can be maintained.

In the electronic scale 10 thus constructed, when a load W is applied onto the tray 11, the movable pole 13 moves downwardly in proportion to the load W. Although the lever 15 provided at the side of the movable pole 13 also moves downwardly in proportion to this move, the lever 15 provided at the side of the fixed pole 12 does not move but remains still. Thus, a pulling force in proportion to the load W will act on the crystal resonator 1.

As shown in FIG. 4, the crystal resonator 1 used in the electronic scale 10 is supported by the supporting bodies 3, 3 in the manner described before with reference to FIG. 2B. These supporting bodies 3, 3 are respectively connected to the levers 15, 15, and flexures 16, 16 are formed at the connected portions. By providing the flexures 16, 16 as described above, even if an offset load is applied to the tray 11, its influence can be minimized.

Figure 5:
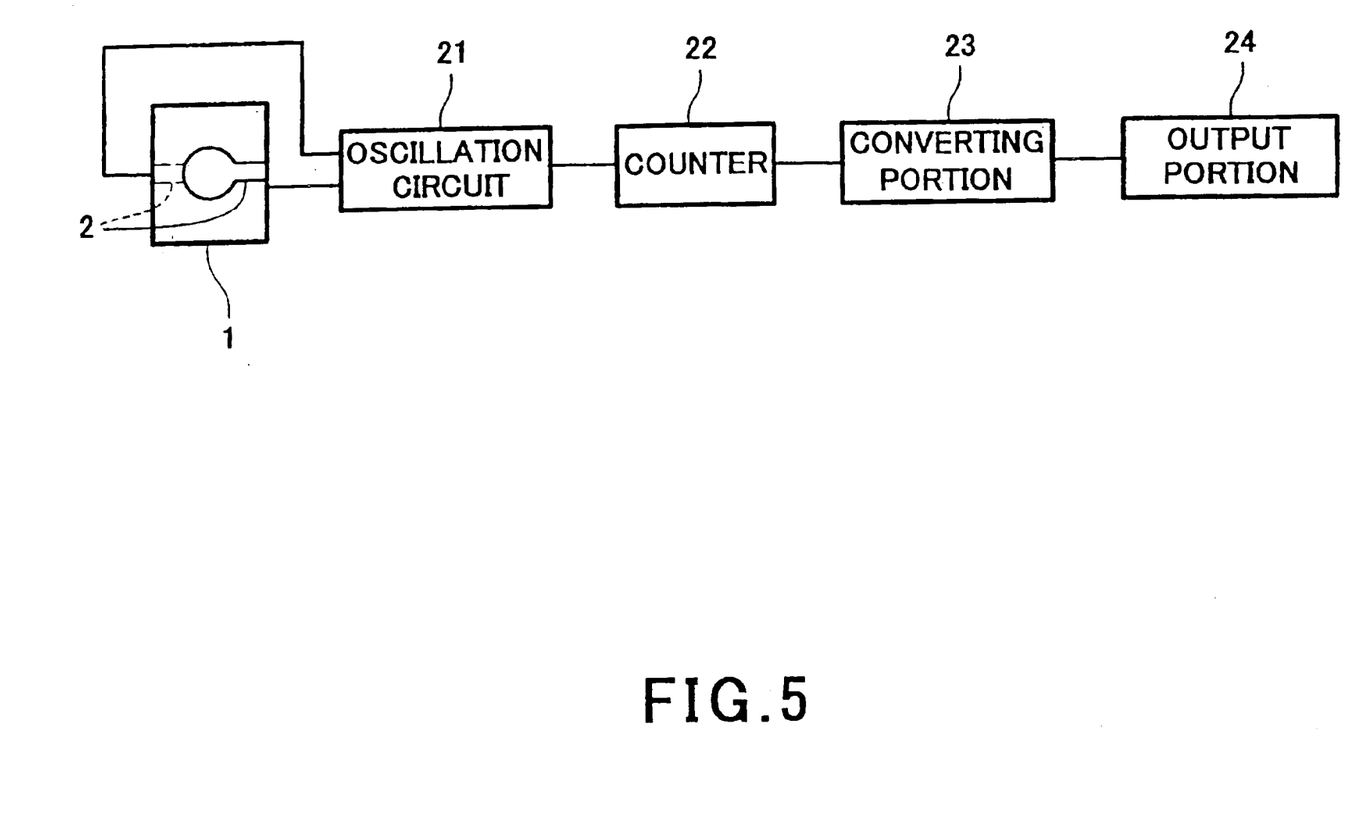
FIG. 5 is a functional block diagram showing an example of a constitution of the electronic scale using the load sensor according to Embodiment 1 of the present invention.

FIG. 5 is a functional block diagram showing a constitution of the electronic scale 10. As described before, the oscillation circuit 21 oscillates in proportion to an inherent frequency of the thickness shear oscillation of the crystal resonator 1. And, a counter 22 counts the oscillation frequency of the oscillation circuit 21 during a predetermined period of time. It should be noted that the counter 22 counts through offsetting the oscillation frequency of the oscillation circuit 21 when zero load W is applied to the tray 11. Therefore, only a varied amount responsible for the load W can be counted.

A converting portion 23 converts the counted values from the counter 22 into weight data. In this case, the converting portion 23 performs such calculations through multiplications of the gravitational acceleration and a variety of proportionality factors, etc., that the converted value becomes equivalent to the weight data obtained when standard weights are placed on the tray 11.

An output portion 24 is comprised of a liquid crystal display, a printer, or the like, and displays, prints, etc., the weight data outputted by the converting portion 23.

Incidentally, when the electronic scale 10 is thus constructed, there might arise such problems that measurement of a load W can not be completed within real time, the resolution is not of practical size, and the like. Therefore, a constitution shown in FIG. 6 is preferred.

Figure 6:
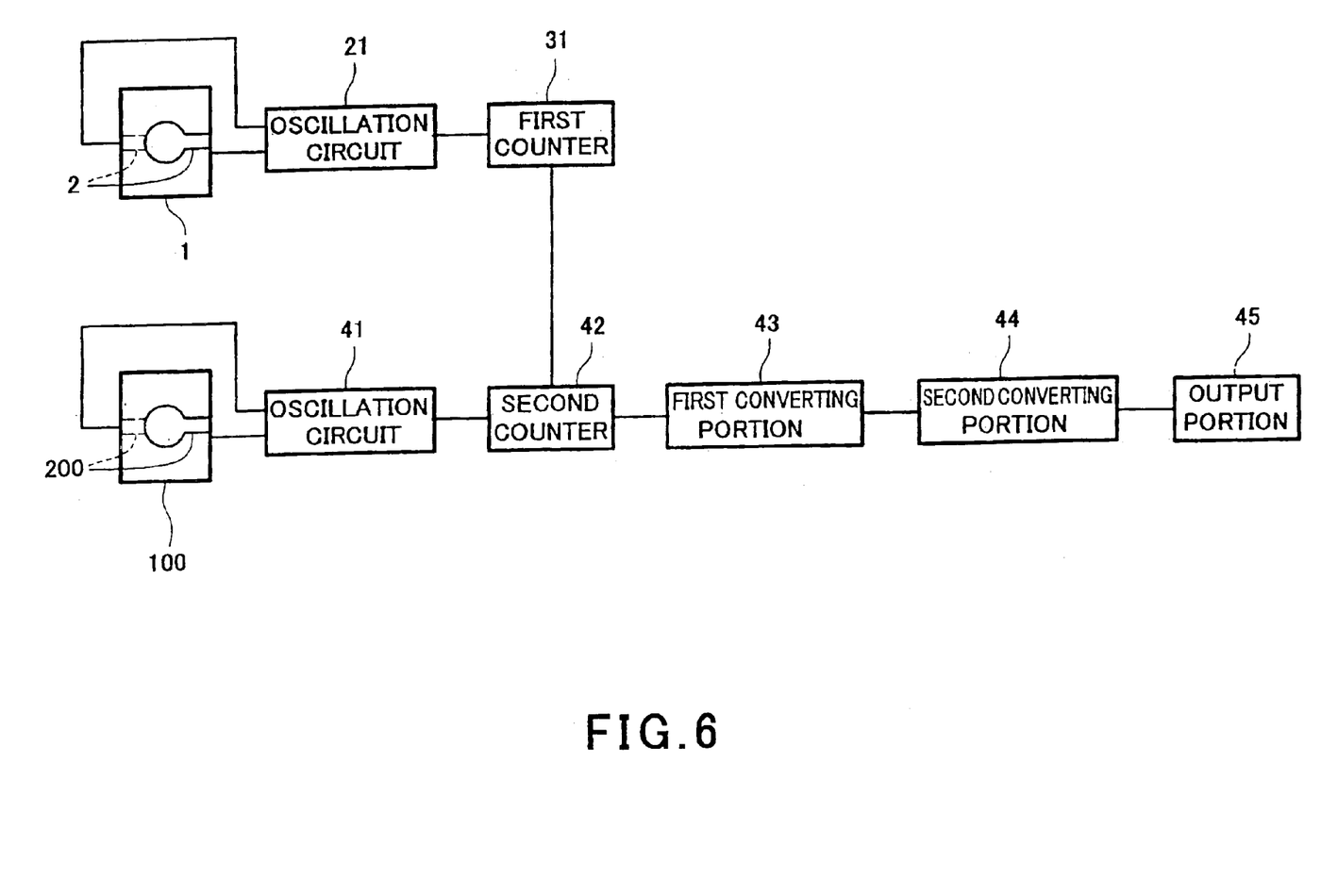
FIG. 6 is a functional block diagram showing an example of a constitution of the electronic scale using the load sensor according to Embodiment 1 of the present invention.

In FIG. 6, a crystal resonator 100 is a quartz piece which can oscillate at approximately 100 times as high a frequency as the crystal resonator 1 and be located at such an adequate place that the influence from a load W is ignored even when the load W is applied to the tray 11. Similarly to the crystal resonator 1, excitation electrodes 200, 200 are respectively affixed to central portions of both surfaces of this crystal resonator 100. And, these excitation electrodes 200, 200 are connected to an oscillation circuit 41, and the oscillation circuit 41 oscillates in proportion to an inherent frequency of the crystal resonator 100.

A first counter 31 counts an integer cycle of an oscillation frequency of the oscillation circuit 21. And, a gate circuit (not shown) that a second counter 42 has is opened or closed according to the counted integer cycle.

The second counter 42 counts an oscillation period of the oscillation circuit 41 while the gate circuit is open. In this case, as a load W increases, that is, as the oscillation frequency of the oscillation circuit 21 increases, the length of time that the gate circuit is open is reduced. Because of this, the counted value of the second counter 42 is inversely proportional to the value of the load W. It should be noted that, similarly to the counter 22 described before, the second counter 42 also counts through offsetting the oscillation frequency of the oscillation circuit 41 when the load W is zero.

A first converting portion 43 calculates a reciprocal number of the period counted by the second counter 42, that is, the frequency. And, a second converting portion 44 processes the conversion from frequencies to weight data, similarly to the converting portion 23 described above. The resulting weight data are displayed or printed by an output portion 45.

When the crystal resonator 100 is provided in addition to the crystal resonator 1 in a manner described thus far, it becomes possible to obtain weight data with high resolution within real time.

Embodiment 2

Figure 7A:
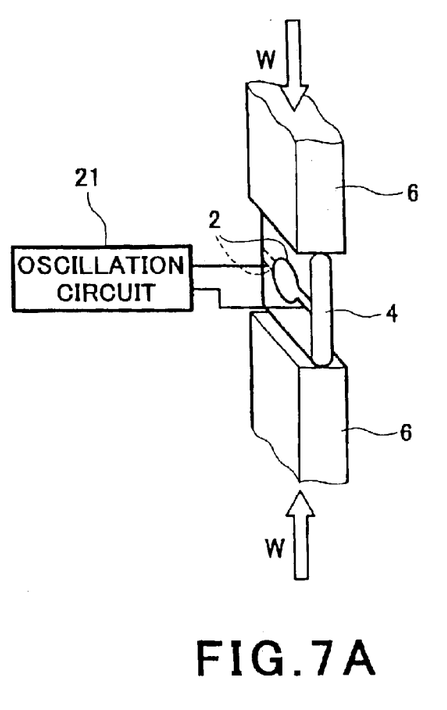
FIGS. 7A and 7B are perspective views showing a constitution of a load sensor using a crystal resonator according to Embodiment 2 of the present invention.
Figure 7B:
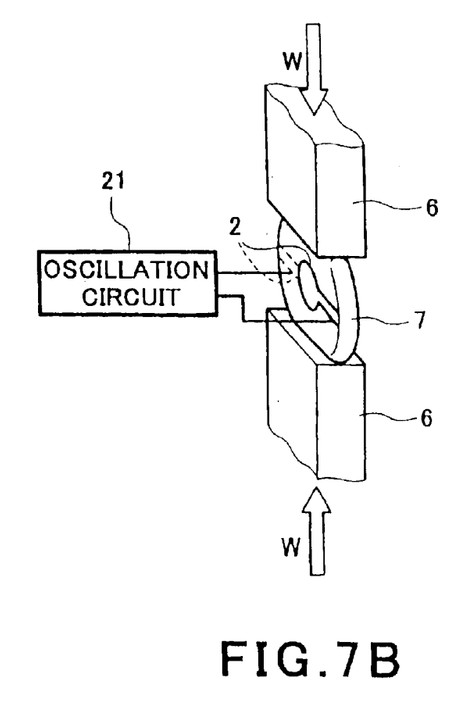

FIGS. 7A and 7B are perspective views showing a constitution of a load sensor with a crystal resonator according to Embodiment 2 of the present invention. In FIG. 7A, a crystal resonator 4 is a rectangular AT-cut quartz piece and retained between rectangular parallelepiped supporting bodies 6, 6 which are respectively in contact with and pressing end faces of one end portion and the other opposing end portion thereof from the outside. The end faces are filed so as to be circular-arc-shaped in cross-section. Since the other elements are identical to those of Embodiment 1, the same or corresponding parts are denoted by the same reference numerals and as such will be not described herein.

Since the end faces of the crystal resonator 4 are circular-arc-shaped, the contacting areas with the supporting bodies 6, 6 are smaller as compared with the case where the end faces are flat. Because of this, when the crystal resonator 4 oscillates in the thickness shear oscillation mode, the oscillation transmitted to the supporting bodies 6, 6 can be minimized, thereby restraining the surrounding mechanism from resonating. Furthermore, since it is also possible to set relatively most moving portions free, high Q can be attained.

Furthermore, a crystal resonator 7 shown in FIG. 7B is a circular AT-cut quartz piece. To form opposing end faces, end portions of this crystal resonator 7 are cut along two adequate parallel lines orthogonal to the oscillating direction of the thickness shear oscillation. The end faces thus formed are shaped to be a circular-arc shape similarly to the one described before. Therefore, the same effects described before can be obtained.

Since circular crystal pieces are generally widely available, the use of such a crystal piece enables the load sensor of the present invention to be implemented easily and at a low cost.

The load sensor thus constructed according to Embodiment 2 of the present invention can be applied to electronic scales similarly to Embodiment 1.

Numerous modifications and alternative embodiments of the invention will be apparent to those skilled in the art in view of the forgoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A load sensor with use of a crystal resonator comprising:

a long plate-shaped crystal resonator;

supporting bodies for respectively supporting both lengthwise end portions of the crystal resonator; and exciting means for exciting a thickness shear oscillation at a center portion of the crystal resonator in the length direction;

wherein middle portions whose thickness is smaller than that of the center portion and both of the end portions are respectively provided between the center portion and both of the end portions;

wherein each of the supporting bodies is shaped to allow a respective one of the end portions and at least a part of a respective one of the middle portions to be fitted to the supporting body, each of the supporting bodies being configured to support a respective end portion with the respective end portion and part of one of the middle portions fitted to the supporting body; and wherein a load is measured based on change in an oscillation frequency of the thickness shear oscillation of the center portion of the crystal resonator generated in proportion to the load acted thereon through the supporting bodies.

2. The load sensor with use of a crystal resonator according to claim 1, wherein the middle portion is configured to form symmetric grooves with respect to a thicknesswise central position of the crystal resonator.

\* \* \* \* \*

UNITED STATES PATENT AND TRADEMARK OFFICE
CERTIFICATE OF CORRECTION

PATENT NO.    : 6,880,407 B2
DATED         : April 19, 2005
INVENTOR(S)   : Masami Yamanaka et al.

It is certified that error appears in the above-identified patent and that said Letters Patent is hereby corrected as shown below:

<u>Title page,</u>
Item [73], Assignee, delete "Yamata" and insert -- Yamato --.

Signed and Sealed this

Twenty-first Day of March, 2006

JON W. DUDAS
*Director of the United States Patent and Trademark Office*